No. 766,662. PATENTED AUG. 2, 1904.
W. P. BRETT.
WINDMILL.
APPLICATION FILED MAR. 7, 1895.
NO MODEL.
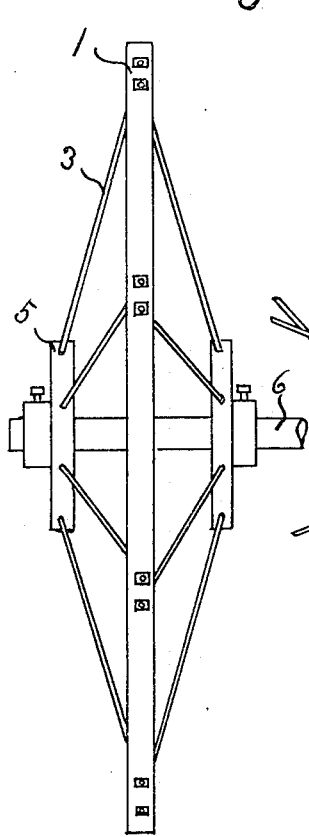
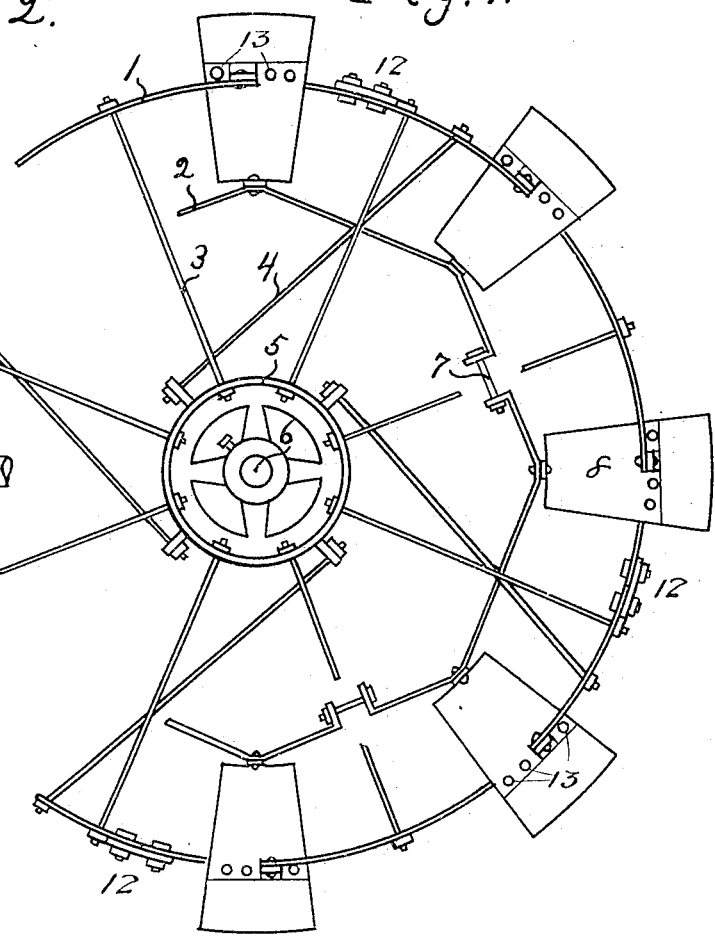
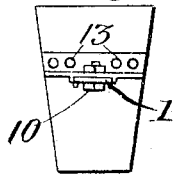
WITNESSES:
Frank P. Wells
James F. White
INVENTOR
William P. Brett No. 766,662. Patented August 2, 1904.

UNITED STATES PATENT OFFICE.

WILLIAM P. BRETT, OF DECATUR, ILLINOIS.

WINDMILL.

SPECIFICATION forming part of Letters Patent No. 766,662, dated August 2, 1904.

Application filed March 7, 1895. Serial No. 540,907. (No model.)

*To all whom it may concern:*

Be it known that I, WILLIAM P. BRETT, a citizen of the United States, residing at Decatur, in the county of Macon and State of Illinois, have invented a new and useful Windmill, of which the following is a specification.

My invention relates to that class known as the "upright or vertical wheel windmill," and has for its object the production of a light, strong, and cheaply-constructed wheel that is adapted to be taken apart and packed in compact form for convenience in storing and shipping and be easily put together again in operative form. I attain these objects by means of the construction illustrated in the accompanying drawings, in which—

Figure 1 is a front view of the wheel with a part broken away; Fig. 2, an edge view showing some of the spokes, the rim, and the axially-separated means for spoke-fastenings to the central part of the wheel; and Fig. 3 is a back view of a modified form of a fan or sail.

Similar figures refer to similar parts throughout the several views.

The skeleton of the wheel is composed of the hub or central portion 5, the rim 1, and the spokes 3 and 4. The spokes are divided into two sets or series that are axially separated at their places of anchorage to the central portion of the wheel, from which they converge to the plane of the rim, to which they are secured at their outer ends, thus securing the rim rigidly and substantially concentric with the hub or central portion of the wheel. I prefer to have some of the spokes anchored tangentially to the hub, somewhat as shown at 4 in Fig. 1, to better brace the wheel for resisting the working strains to which it will be subjected. The rim 1 is preferably made in sections and arranged to be detachably secured together, as shown at 12 in Fig. 1, and the fans or sails may be made so as to be secured to the rim, as shown in either Fig. 1 or Fig. 3, and so that the area of the portion of the fan that projects outside of the rim is about equal to the area of the part that projects inwardly from the rim, so that they are practically balanced on their anchorage thereto, and to secure them more rigidly an inner band or stringer 2 is secured to the inner ends of the fans and contractibly arranged, as shown at 7, Fig. 1, so that any desired tension can be given to it, thus securing the fans against any tendency to wabble by the action of the wind on them. This band or stringer is also preferably made in sections and arranged to be detachably connected in operative form and independent of any anchorage or attachment to either the spokes or the central portion of the wheel.

What I claim as my invention, and desire to secure by Letters Patent, is—

1. In the wheel of a windmill, in combination a central portion provided with means for the attachment of two, axially-separated, sets or series of spokes, a rim, two sets or series of spokes attached to said central portion and rim, fans or sails anchored to said rim, and a contractible band or stringer attached to the inward extensions of the fans or sails and anchored approximately central with said rim and independent of any attachment or anchorage to either the spokes or central parts of the wheel.

2. In the wheel of a windmill, in combination a hub or central portion, a rim, spokes securing said rim substantially concentric with said central portion, fans or sails made in two parts that are detachably connected at the point or place of their anchorage to said rim, and a band or stringer that is detachably connected and exclusively anchored to the inward extensions of the fans or sails.

3. In the wheel of a windmill, in combination a hub or central portion, provided with means for the attachment of two, axially-separated, sets or series of spokes, a rim, two sets or series of spokes attached to said central portion and rim, fans or sails anchored to the rim, and a band or stringer to which the inward extensions of said fans or sails are attached; said band or stringer being suspended practically central with said rim, between said two sets or series of spokes and independent of any attachment or anchorage to either the spokes or central parts of the wheel.

4. In the wheel of a windmill, in combination a hub or central portion, a rim, spokes, and two-part fans or sails anchored to said rim exclusive of any attachment or anchorage to either the spokes or central portion of the wheel; said fans or sails being divided practically at right angle to the center line of their length and detachably connected together at the point or place of their anchorage to the rim.

5. In the wheel of a windmill, in combination a central portion provided with means for spoke attachments, a rim, spokes attached to said central portion and rim, fans or sails made in two parts and detachably anchored to said rim, and a sectional band or stringer detachably connected and secured to the inward extensions of the fans or sails and anchored substantially central with said rim and independent of any attachment or anchorage to either the spokes or central parts of the wheel.

6. In the wheel of a windmill, in combination a hub or central portion, a rim, spokes attached to said central portion and rim, fans or sails secured to said rim, and a contractible band or stringer anchored to the inward extensions of said fans or sails exclusive of any anchorage or attachment to either the spokes or central parts of the wheel.

7. In the wheel of a windmill, in combination a hub or central portion, a rim, spokes secured to said central portion and rim, fans or sails secured to said rim, and a detachably-connected sectional band or stringer secured to the inward extensions of the fans or sails and independent of any anchorage or attachment to either the spokes or said central portion.

8. In the wheel of a windmill, in combination a hub or central portion, a rim, spokes connecting said hub and rim, and two-part fans or sails divided approximately at right angle to the center line of their length and detachably anchored to said rim independent of any anchorage or attachment to either the spokes or the central parts of the wheel.

9. In the wheel of a windmill, in combination a hub or central portion, a rim composed of detachably-connected sections, spokes detachably secured to said central portion and rim, fans or sails detachably secured to said rim, and a detachably-connected sectional band or stringer anchored to the inward extensions of said fans or sails and independent of any attachment or anchorage to the spokes or said central portion.

WILLIAM P. BRETT.

Witnesses:
H. P. PAGE,
W. C. OUTTIN.